United States Patent [19]

Week et al.

[11] 4,206,583

[45] Jun. 10, 1980

[54] CUTTERBAR FLOATATION SYSTEM

[75] Inventors: Robert D. Week, Bloomington, Minn.; Orlin W. Johnson, East Moline, Ill.; Dathan R. Kerber, Bettendorf, Iowa

[73] Assignee: International Harvester Company, Chicago, Ill.

[21] Appl. No.: 939,002

[22] Filed: Sep. 1, 1978

[51] Int. Cl.² ............................................ A01D 47/00
[52] U.S. Cl. ........................................ 56/15.8; 56/208
[58] Field of Search ....................... 56/15.8, 15.9, 208, 56/14.4, 10.2

[56] References Cited

U.S. PATENT DOCUMENTS

| 3,959,957 | 6/1976 | Halls | 56/208 |
| 4,011,709 | 3/1977 | Mott et al. | 56/208 |

*Primary Examiner*—Jay N. Eskovitz
*Attorney, Agent, or Firm*—Neal C. Johnson; F. David AuBuchon

[57] ABSTRACT

A crop harvesting header for a self-propelled combine. The header includes a "floating" cutterbar which is flexible and movable up and down so as to cut a standing crop (soybeans, for example) close to the ground to minimize crop losses. The flexibility and movement enable the crop to be cut closely to the ground even though the ground is uneven or undulating across and along the harvesting path. The cutterbar is mounted on a plurality of ground-engaging structures including runners upon which a counterbalancing system imposes pre-selected forces to control the ground pressure of the cutterbar as ground and crop conditions vary. The counterbalancing system provides a substantially constant ground pressure throughout cutterbar movement. The effect of the system is to moderate or eliminate the variations which come from spring force changes.

6 Claims, 5 Drawing Figures

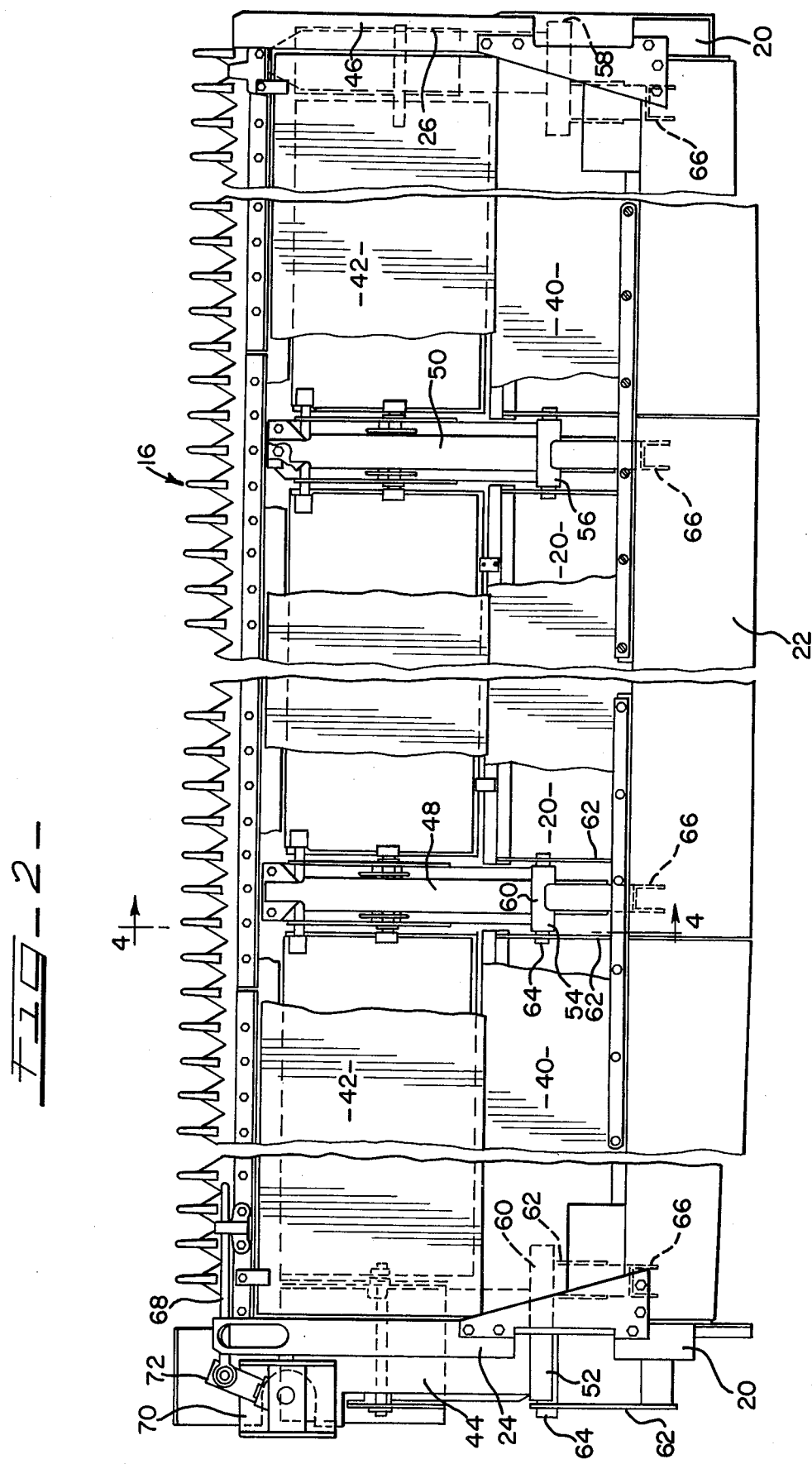

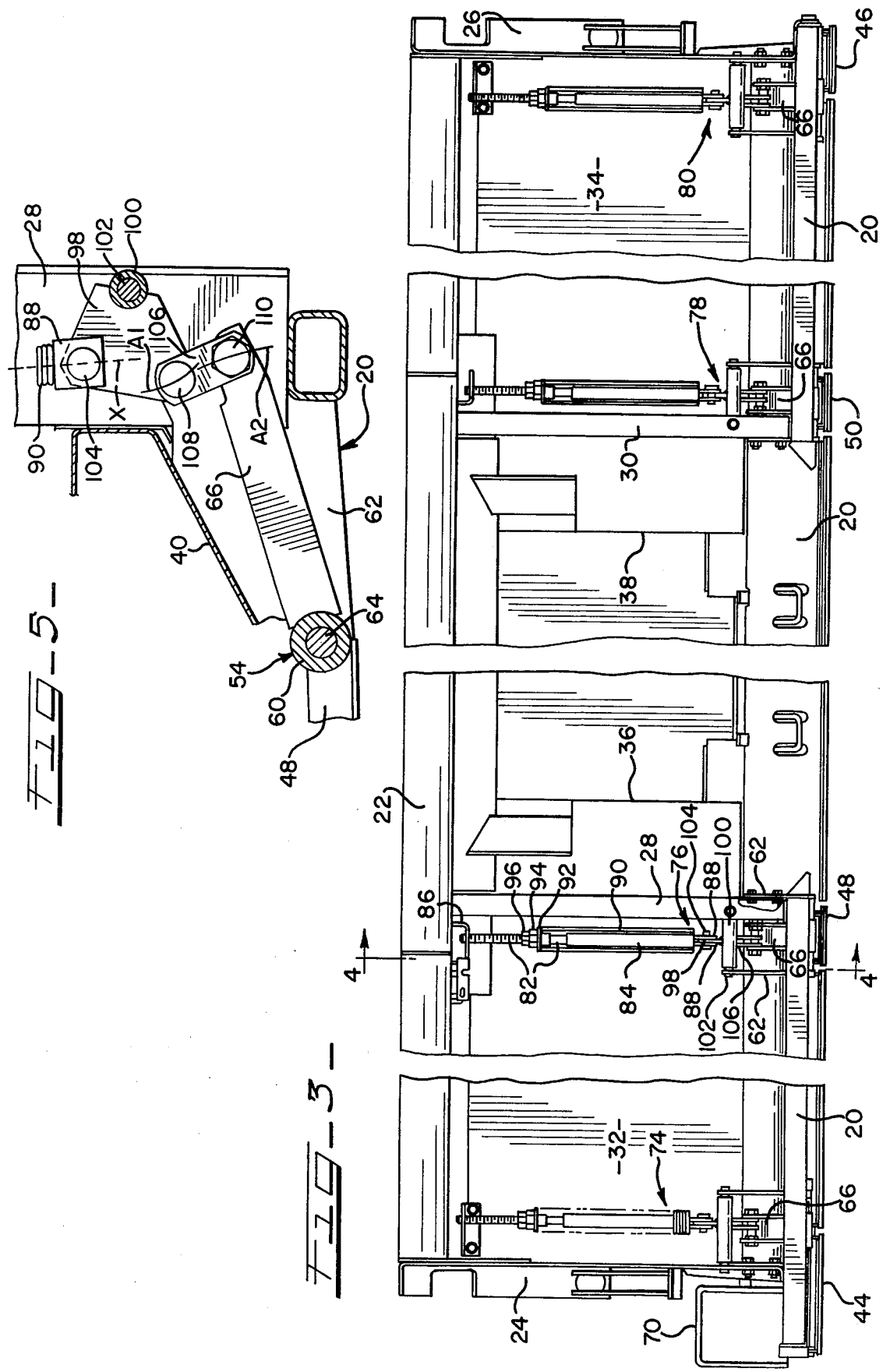

CUTTERBAR FLOATATION SYSTEM

BACKGROUND OF THE INVENTION

1. Field of the Invention

The invention relates generally to crop harvesting headers and more particularly to an improved system for mounting and counterbalancing a floating cutterbar on a header.

2. Prior Art

Resilient suspension of floating-type cutterbars is well known as evidenced by several U.S. patents: U.S. Pat. Nos. 1,996,294; 2,472,762; 2,795,922; 2,915,870; and 3,982, 383.

While showing a variety of spring arrangements the patents display a common feature. That is, the spring force which counterbalances or supports the cutterbar is variable throughout the moving range of the cutterbar. This is so because the force rate of the springs necessarily varies as the springs flex or expand and contract through their range of movement. For example, the output force of a loaded spring varies linearly with expansion of the spring.

The practical effect of the linear spring rate in floating cutterbars is to produce variable ground pressure of the cutterbar. And this variable ground pressure can have an adverse effect on maintaining a desired cutting height along the length of the cutterbar. This remains true even though the system may include means for pre-adjusting or selecting the cutterbar supporting force as in U.S. Pat. Nos. 2,915,870 or 2,472,762. The problem may thus be summarized in that prior art systems cannot provide a substantially constant ground pressure of a cutterbar with resulting inability to maintain a desired cutting height throughout the range of movement of the cutterbar.

SUMMARY

The invention provides an improved system for floatably suspending and counterbalancing a cutterbar on a crop harvesting header. The system includes means for imposing a substantially constant counterbalancing force throughout the full range of cutterbar movement relative to the header. This results in a more constant ground pressure of the cutterbar and more assurance of maintaining a desired cutting height along the length of the cutterbar. The system includes a plurality of runner structures pivotally mounted on the header frame and having ground-engaging portions or skid shoes. The cutterbar is connected to the forward ends of the runners. A spring in combination with a mechanical linkage imposes a substantially constant force on each runner and thus the cutterbar is supported on the ground with substantially constant ground pressure throughout the full range of cutterbar movement. The invention substantially eliminates the prior art problems of variable ground pressure of the cutterbar as caused by linear spring rates.

Briefly, the objects of the invention are to provide a cutterbar suspension and floatation system which: improves the crop cutting characteristics of a crop harvesting header; enables the cutterbar to engage the ground with a substantially constant pressures throughout the full range of cutterbar movement; and eliminates the problems associated with linear spring rates of prior systems.

DESCRIPTION OF THE DRAWINGS

FIG. 2 is a plan view of the crop harvesting header of FIG. 1;

FIG. 3 is a rear elevational view of the header;

FIG. 5 is an enlarged fragmentary sectional view of a portion of the counterbalancing system of the invention.

DESCRIPTION OF THE PREFERRED EMBODIMENT

Figure 1:
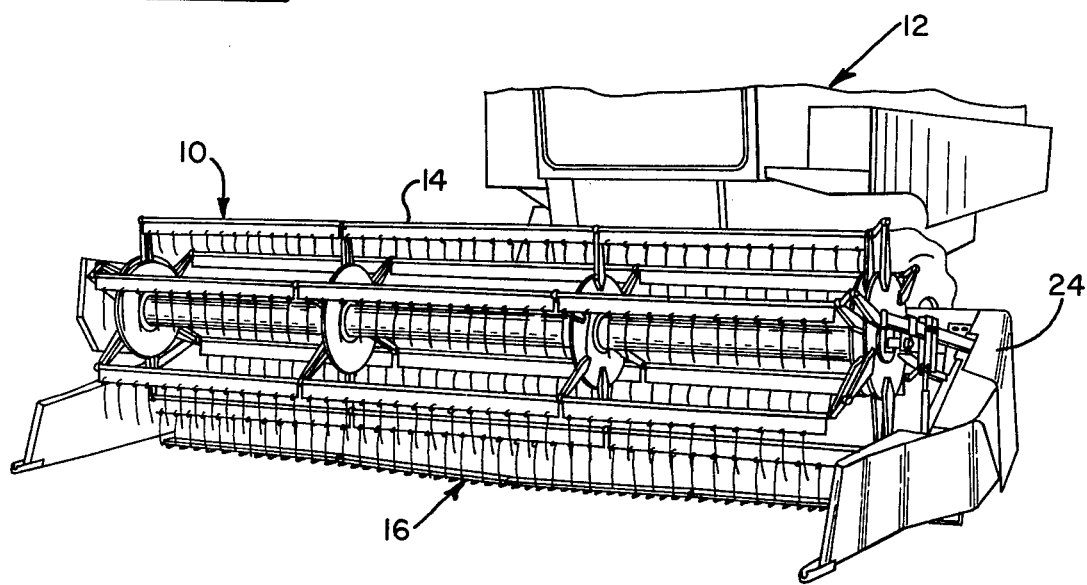
FIG. 1 is a fragmentary perspective view of a crop harvesting header mounted on a self-propelled combine.

Referring first to FIG. 1 there is shown a header 10 mounted by conventional means on a self-propelled combine 12. The header 10 includes a conventional reel 14 for engaging a standing crop and moving it rearwardly for cutting by a cutterbar shown generally at 16 extending the length of the header. An auger 18 (shown schematically in FIG. 4) consolidates the cut crop centrally on the header from which the crop is moved rearwardly by conventional means into the combine.

Figure 4:
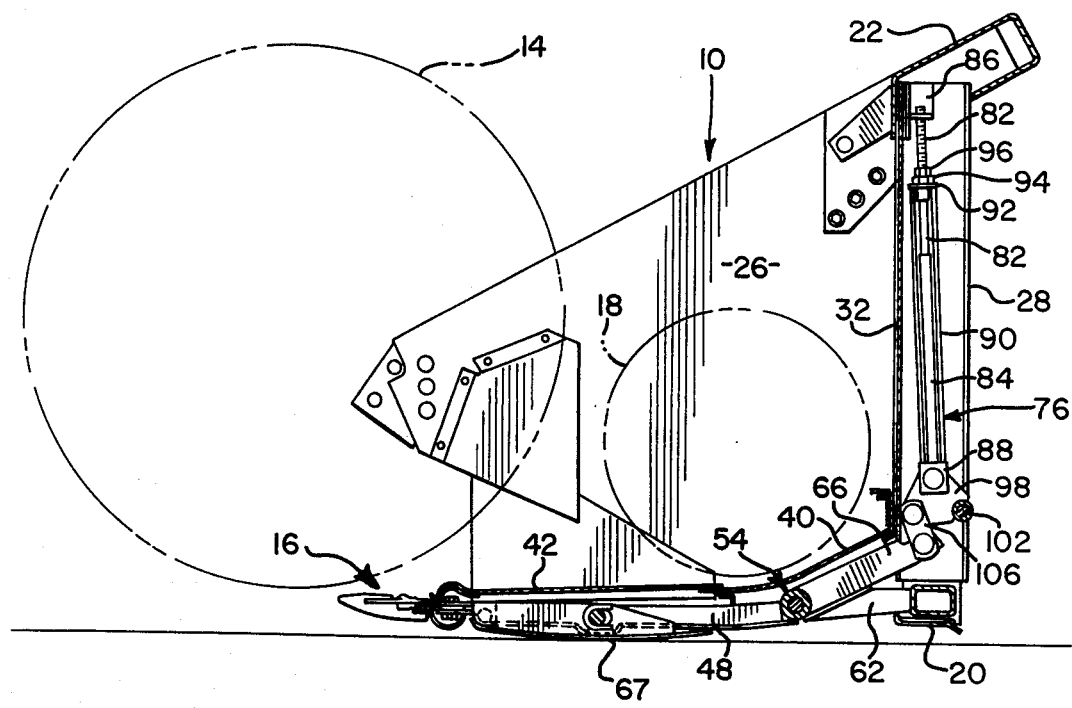
FIG. 4 is a sectional view of the header taken along lines 4—4 of FIG. 3.

As best shown in FIGS. 2 through 4 the header 10 has a basic structural framework including a lower beam assembly 20, an upper beam assembly 22, opposite end walls 24 and 26, and vertical channels 28 and 30 (FIG. 3) extending between the upper and lower beam assemblies. Sheet structures 32 and 34 are disposed vertically along the rear of the header from the respective end walls 24 and 26 inwardly and terminate at respective edges 36 and 38 which together with the upper and lower beams define the feed outlet opening to the combine. A fixed bottom sheet 40 extends between the end walls 24 and 26 beneath the auger 18 and together with the back sheets 32 and 34 provide a so-called "wrap" for the crop conveying auger 18. A movable sheet 42 is pivotally connected to the forward edge of the sheet 40 and is slidably connected along its forward edge to the cutterbar 16. In practice the sheet 42 may consist of several longitudinally overlapping sections to facilitate flexure of the cutterbar along its length.

The cutterbar 16 is supported on the header 10 by a pair of end runners 44 and 46 and a pair of internal runners 48 and 50 all connected at their forward ends to the cutterbar. The runners 44, 48, 50, and 46 are pivotally connected to the header by pivot structures shown at 52, 54, 56, and 58 respectively in FIG. 2. Each pivot structure includes a cylindrical bushing 60 welded to the respective runner, a pair of plates 62 welded to the lower beam assembly 20, and a pin 64 mounted through the plates 62 and the bushing 60. It will of course be understood that the pivot connections are coaxially aligned and permit the cutterbar 16 to move up and down relative to the header. As best shown in FIGS. 4 and 5 the pivot connections are disposed intermediate the ends of the runners thus defining a rearward end 66 of each runner projecting rearwardly of the back wall 32 and 34 of the header and above the lower beam assembly 20. In practice an additional runner (not shown) may be connected to the cutterbar midway between the intermediate runners 48 and 50 to provide additional support. Further, each runner is preferably equipped with a ground-engaging shoe shown at 67 in FIG. 4 and thus reference to "runner" herein includes such ground engaging structure.

The cutterbar 16 is itself of the usual type having a reciprocating knife 68 driven by a wobble drive unit 70. The drive unit 70 has a rotary input drive (not shown) and an oscillating output drive arm 72 connected to the knife 68. The unit 70 is mounted on the end runner 44 outside of the wall structure 24 of the header. The cutterbar 16 is vertically flexible along its length so as to maintain a close cutting relation to the ground despite ground level variations across the harvesting path of the header.

In accordance with the invention means are provided for counterbalancing the cutterbar so that the cutterbar will engage the ground with a substantially constant pressure as the cutterbar moves up and down with ground level variations. As shown generally in FIG. 3 a plurality of counterbalancing assemblies are shown at 74, 76, 78, and 80 disposed adjacent to the rear wall structure of the header and operatively associated with the runners 44, 48, 50 and 46 respectively. Each of the counterbalancing assemblies is essentially the same in construction and hence only the assembly 76 shown in FIGS. 3, 4, and 5 need be described in detail.

An elongated rod 82 is telescopically received in a tube 84. The upper end of the rod 82 is threaded and is retained in a bracket 86 fastened to the rear wall structure of the header. The lower end of the tube 84 is welded to a pair of spaced ears 88 (FIG. 3). An elongated coil spring 90 is disposed about the tube 84 and rod 82 in engagement at its lower end with the ears 88 and at its upper end with a washer 92 on the threaded portion of the rod 82. The washer 92 is retained against an adjustment nut 94 which is in turn backed by a lock nut 96.

Each of the counterbalancing assemblies further includes a plate or arm 98 having a transverse integral sleeve 100 journalled on a pin 102 extending through the plates 62 of the header frame. The plate 98 is received between the ears 88 and is pivotally connected thereto by a pin 104. A pair of bar links 106 is pivotally connected between the plate 98 and the runner end 66 by pins 108 and 110. It will be seen in FIG. 5 that the links 106 are disposed in force-transmitting relation generally along a line tangent to the arcs A1 ad A2 drawn about the pivot axes of the plate 98 and runner end 66 respectively. (Moreover, the links 106 remain in substantially this same orientation throughout the full range of movement of the runner end 66). The effect of this orientation will be clearer as the description proceeds.

In operation, the ground pressure of the cutterbar can be preselected by adjusting the force of the spring 90 of each counterbalancing assembly. This is accomplished by turning the adjustment nut 94 up or down on the rod 82 to vary the length of the compressed spring. The lock nut 96 retains the adjustment nut 94 in the desired position. A practical example of preselecting ground pressure for given field and crop conditions would be for stiff stubble conditions requiring heavy contact pressure to crush the stubble to achieve a low cutting height.

As will be seen with reference to FIG. 4 the cutterbar 16 is floatably supported at each runner by the respective coil spring 90 exerting a downward force on the plate 98 tending to pivot it downwardly about the pivot pin 102. The force is transmitted through the pair of links 106 to the runner end 66. This tends to lift the cutterbar about the pivot connection 54 of the runner to the header. Referring to FIG. 5 the coil spring 90 exerts its force downwardly along the dotted line X. Should the runner end 66 swing downwardly about pin 102. It will be seen that the force line X of spring 90 will shift to the left away from the pin 102. Accordingly, the moment arm of the spring force increases even as the force of the spring itself decreases through extension of the spring. The above-mentioned orientation of the links 106 now comes into play. Because the line of force through the links 106 is disposed tangentially at the arcs A1 and A2, there is minimal change in the moment arm about the pivot pin of the runner. Thus, the change in the moment arm between force line X and the pivot pin 102 remains the principal factor in maintaining a substantially constant counterbalancing force as the force of the spring 90 varies. In actual practice the counterbalancing force is not exactly constant but is definitely much less variable than the spring force.

By the foregoing, Applicants have provided a cutterbar support and floatation system well suited to acomplishing the objects of the invention.

What is claimed is:

1. A harvesting header for a mobile harvesting machine comprising:
    a header frame;
    a cutterbar movably mounted on said frame to follow variable ground profile;
    and means including a spring for maintaining a substantially constant counterbalancing force on said cutterbar despite variations in the spring force throughout the cutterbar movement, said cutterbar being connected to the forward ends of the plurality of fore-and-aft extending runners pivotally supported on said header frame, said means including a linkage interposed between said spring and one of said runners for applying a mechanical advantage to maintain the counterbalancing force as the spring force varies.

2. A harvesting header for a mobile harvesting machine comprising:
    a transversely elongated header frame;
    a floating cutterbar for cutting a standing crop;
    a plurality of transversely spaced fore-and-aft extending runners connected to said cutterbar at their forward ends to provide ground support for the cutterbar and pivotally connected to said header frame intermediate their ends whereby the cutterbar is vertically movable relative to the header frame to follow variable ground profile;
    and means for imposing a counterbalancing force on said cutterbar which provides a substantially constant pressure of the runners on the ground throughout cutterbar movement relative to the header frame, said means including a mechanical linkage coupled to one of said runners so as to be responsive to vertical movement of said cutterbar, a spring operatively connected to said linkage to resist downward movement of the cutterbar, said linkage including means for maintaining a counterbalancing spring force on the cutterbar even as the force of the spring itself decreases upon upward movement of the cutterbar.

3. A harvesting header for a mobile harvesting machine comprising:
    a transversely elongated header frame;
    a floating cutterbar for cutting a standing crop;
    means mounting the cutterbar on the header frame for vertical movement relative thereto to accommodate variable ground profile, said means including a plurality of fore-and-aft extending transversely spaced runners connected at their forward ends to said cutterbar to provide ground support for the cutterbar and pivotally connected intermediate their ends to said header frame whereby the rearward ends move up and down oppositely to said cutterbar;

and a counterbalancing system for the cutterbar including a compression spring anchored to the header frame, a force transmitting linkage operatively connected between said spring and the rearward end of a runner, said linkage including a first link pivotally mounted on the header frame in connection with said spring, a second link pivotally connected to said first link at one end and to the rearward end of the runner at the other end, said second link being disposed in force transmitting relation generally along a line tangent to the arcs of movement of the ends of the second link about the pivot point of said first link and the pivot point of the runner respectively.

4. A harvesting header for a mobile harvesting machine comprising:

a transversely elongated header frame;

a floating cutterbar for cutting a standing crop;

means mounting the cutterbar on the header frame for vertical movement relative thereto to accommodate variable ground profile, said means including a plurality of fore-and-aft extending transversely spaced runners connected at their forward ends to said cutterbar to provide ground support for the cutterbar and pivotally connected intermediate their ends to said header frame whereby the rearward ends move up and down oppositely to said cutterbar;

and a counterbalancing system for the cutterbar including a compression spring anchored to the header frame, a force transmitting linkage operably connected between said spring and the rearward end of a runner, said linkage including means for maintaining a counterbalancing force on the cutterbar despite substantial variation in spring force throughout cutterbar movement.

5. A harvesting header for a mobile harvesting machine comprising:

a transversely elongated header frame;

a floating cutterbar for cutting a standing crop;

means mounting the cutterbar on the header frame for vertical movement relative thereto to accommodate variable ground profile, said means including a plurality of fore-and-aft extending transversely spaced runners connected at their forward ends to said cutterbar to provide ground support for the cutterbar and pivotally connected intermediate their ends to said header frame whereby the rearward ends move up and down oppositely to said cutterbar;

and a counterbalancing system for the cutterbar including a spring in compression between the header frame and the rearward end of the runner such that upward and downward movement of the cutterbar results in lesser and greater spring force respectively, said system including a mechanical linkage interposed between said spring and the runner for moderating the counterbalancing force to a range less variable than the spring force.

6. The subject matter of claim 5, wherein said linkage includes a first link pivotally mounted on the header frame in connection with said spring in such manner that the moment of said first link about its pivot point increases as the spring force decreases, and a second link pivotally connected at one end to said first link and at its other end to the rearward ends of the runner for transmitting the spring force to the runner.

* * * * *